United States Patent Office 2,766,191
Patented Oct. 9, 1956

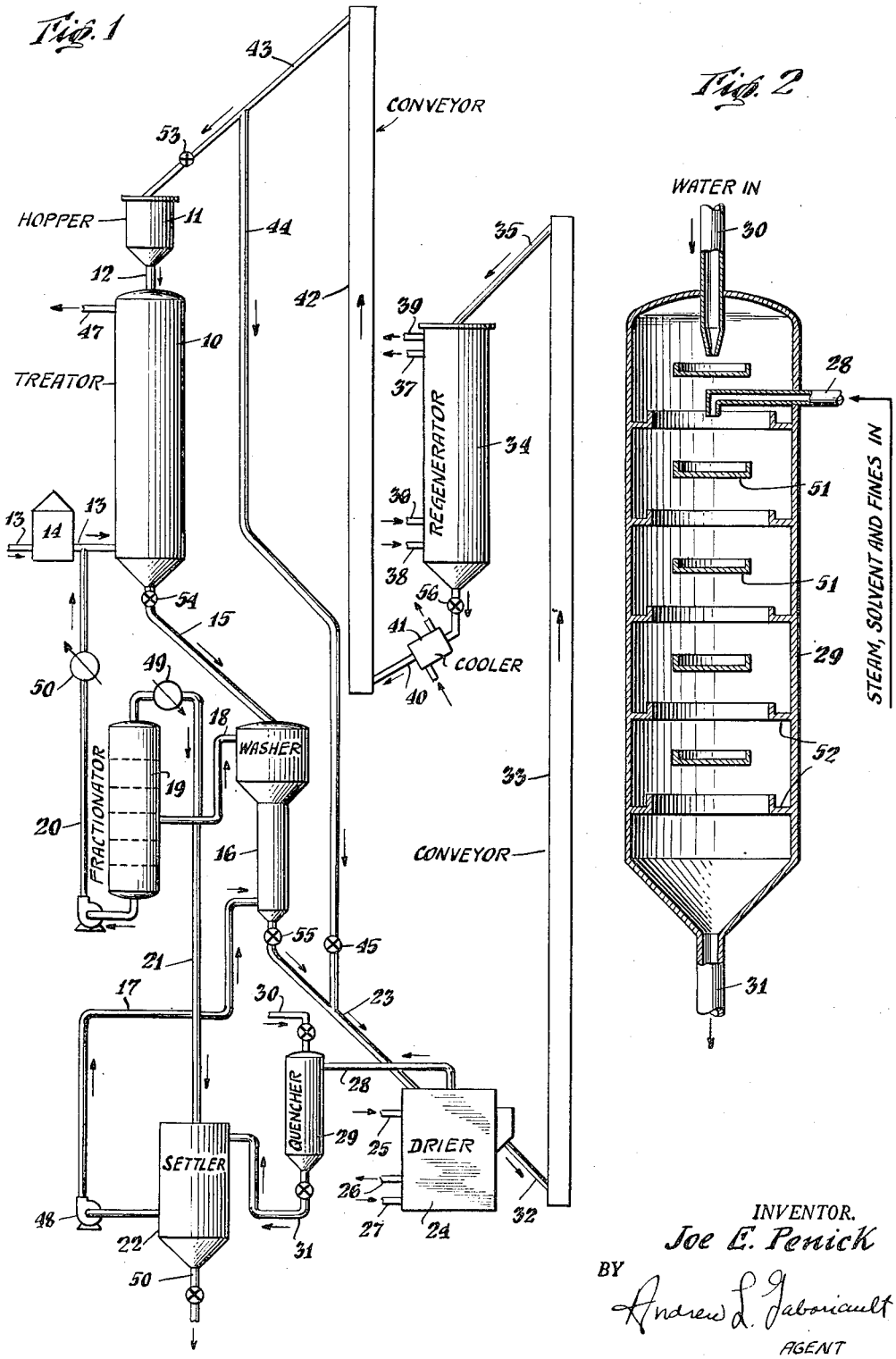

2,766,191

PROCESS FOR THE REMOVAL OF FINE POWDERY MATERIAL FROM AN ADSORBENT SOLID

Joe E. Penick, Augusta, Kans., assignor to Socony Mobil Oil Company, Inc., a corporation of New York Application March 22, 1952, Serial No. 277,982

5 Claims. (Cl. 196—147)

This invention relates to improvements in processes for the continuous treatment of liquid hydrocarbon oils with granular adsorbent solids. It is particularly concerned with a continuous process for the removal of fine powdery material from the adsorbent in such continuous percolation processes and with a process for starting up such processes.

Typical of processes to which this invention applies is the process for the continuous percolation of liquid mineral oils through a granular adsorbent for the purpose of purifying the oil. This purification may include, for example, decolorization, neutralization, removal of suspended, colloidal or dissolved impurities such as carbon or coke or oxygen and nitrogen containing impurities and other gum-forming compounds, and improvement of the demulsibility properties of the oil.

In conducting processes of this type the adsorbent employed should be made up of palpable particles of size within the range about 4–100 mesh and preferably 10–60 and still more preferably 15–30 mesh by Tyler Standard Screen Analysis. The particles may take the form of pellets, tablets, capsules, pills, spheres or the like or granules of irregular shape such as are obtained from grinding and screening. The terms "adsorbent in palpable particulate form" and "palpable particle form adsorbents" as employed herein in describing and claiming this invention are intended to generically cover particles of any or all of these shapes having substantial size as distinguished from finely divided particles. Typical of adsorbents which may be employed are fuller's earth, bauxite, bentonite and bone char, charcoal, magnesium silicate, heat and acid activated kaolin, activated carbon, and certain synthetic adsorbents such as silica-alumina gel.

In a commercial process of the above mentioned type, the adsorbent is gravitated downwardly as a columnar mass through a confined treating zone. Liquid oil flows upwardldy through this mass to effect the desired treating. The adsorbent is contaminated by carbonaceous deposits after effecting this treatment and must, therefore, be reconditioned before it can be reused in the treating zone. Before reconditioning, however, the adsorbent is washed in a confined washing zone with a suitable washing solvent, such as petroleum naphtha, to remove any adhering liquid oil. After washing, the adsorbent is dried to free it of adhering solvent and then passed to the regeneration zone wherein the used adsorbent is reconditioned by burning off the carbonaceous contaminants. This burning is accomplished by passing an oxygen containing gas through a bed of the adsorbent.

It is apparent that in this type process wherein the adsorbent is continuously circulated through treating zone, washing zone, drying zone, and regeneration zone that some attrition of the adsorbent granules will occur which results in the production of fine powdery material of a size considerably smaller than the adsorbent granules. The fines produced may range in particle size, for example, down to 400 mesh Tyler. These fines tend to gather and fill in the voids between the adsorbent granules making gas and liquid flow through the adsorbent beds more difficult. The fines also tend to accumulate in regions or zones and thereby cause undesirable channeling through the adsorbent beds.

A further difficulty in processes of the above-mentioned types occurs when it is necessary to start up the process. All of the adsorbent is cool and may contain excessive amounts of fines and foreign material. Since effective treatment at practical throughout capacity usually requires an elevated temperature and a limitation on the amount of fines present, it is desirable to condition the adsorbent prior to its use for treating oil.

An object of this invention is to provide in a continuous process for treating liquid hydrocarbon oils with granular adsorbents, a method for controlling the amount of fines present in the adsorbent.

Another object of this invention is to provide, in a continuous process for treating liquid oils with granular adsorbent, a process for the continuous removal of fine powdery material from the adsorbent.

Another object of this invention is to provide, in a continuous process for the treatment of liquid mineral oils with a granular adsorbent, a method for preconditioning the adsorbent prior to its use for treating oils.

These and other objects of the invention will become apparent from the following discussion of the invention.

This invention describes a process wherein the granular adsorbent is passed cyclically through a treating zone, a washing zone, a drying zone and a regeneration zone. A stream of inert stripping gas, such as superheated steam, is passed upwardly through the drying zone at a rate sufficient to entrain the adsorbent fines therein in the gas and to strip the adsorbent in the drying zone of vaporizable material, mainly adhering washing solvent. The vaporized material from the adsorbent, stripping gas, fines and other foreign matter are removed from the drying zone to a quenching zone wherein vaporized material and stripping gas are condensed and liquified. Condensed vaporized material, stripping gas and fines are passed to a separation zone wherein the condensed vaporized material is separated from the condensed stripping gas and fines. The fines and condensed stripping gas are then discarded from the system.

In some forms of this invention, a portion of the regenerated adsorbent may be recycled to the drying zone.

This invention is particularly important for use during start-up periods of the percolation system. During these periods adsorbent may be cycled only through the regeneration zone and drying zone until the desired amount of fines is removed and until heated therein to the desired treating temperature.

The invention is best understood by reference to the attached drawings of which, Figure 1 is an elevational view showing the process of this invention, and Figure 2 is an elevational view, partially in section, of a type of quencher which may be used in the process of this invention.

Both of these drawings are highly diagrammatic in form and like parts in both drawings bear like numerals.

Referring to Figure 1, there is shown therein a treating vessel 10 with supply hopper 11 thereabove, connected to vessel 10 by conduit 12. An oil feed conduit 13 passes through a heater 14 into the lower section of vessel 10. A used adsorbent drain conduit 15 extends from the lower section of vessel 10 into the upper section of washing vessel 16. A solvent feed conduit 17 extends into the lower section of vessel 16 from a solvent accumulator 22 and a solvent outlet conduit 18 extends from the upper section of vessel 16 into fractionator 19. A bottoms line 20 connects the bottom of fractionator 19 with feed conduit 13 and an overhead 21 connects the top of 19 with settler 22. Conduit 23 extends from the bottom of vessel 16 into the upper section of drier 24. Heat transfer tubes (not shown) are provided within the drier and have an inlet pipe 25 and an outlet pipe 26. A conduit 27 extends into the lower section of vessel 24 for the supply of inert stripping gas. A vapor outlet conduit 28 extends from the upper end of vessel 24 into quencher 29. A cooling fluid inlet 30 is provided at the upper end of quencher 29 and an outlet conduit 31 extends from the bottom of the quencher into separator 22. Conduit 32 for dried adsorbent extends from the drier into conveyor 33. The conveyor may take any suitable form, such as a bucket elevator or gas lift. The top of conveyor 33 connects into the upper section of regenerator 34 by means of conduit 35. Regenerator 34 is provided with heat transfer coils (not shown) having inlet 36 and outlet 37. Regeneration gas inlet conduit 38 is provided in the lower section of vessel 34 and flue gas outlet conduit 39 extends from the upper section of 34. A discharge conduit 40 extends from the bottom of vessel 34, through a cooler 41 to the bottom of conveyor 42. Conduit 43 connects the top of conveyor 42 with hopper 11. A recycle conduit 44, having valve 45 therein, connects the intermediate section of conduit 43 with the intermediate section of conduit 23.

In the normal operation of the process of this invention valve 45 in line 44 is kept closed, while valve 53 in line 43 remains open. Liquid charge oil, which may be a fuel oil or lubricating oil of low asphalt content, is heated in heater 14 to a temperature suitable for adsorbent contacting and then passed by means of conduit 13 into the lower section of treating zone 10. A columnar mass of granular adsorbent is maintained within zone 10 and the liquid oil passes upwardly through this mass and is purified. Purified oil is withdrawn through passage 47. Used adsorbent is passed from the lower section of zone 10 into the upper section of washing zone 16. The adsorbent passes through the washing zone as a columnar mass and is contacted by upwardly flowing wash solvent which removes any adhering oil from the used adsorbent. Suitable wash solvents include petroleum naphtha boiling within the range 100°–400° F., carbon tetrachloride, normal heptane, normal octane and carbon disulfide. A paraffinic naphtha boiling within the range about 210–300° F. is preferable. Wash solvent is pumped to the lower section of zone 16 from settling zone 22 through passage 17 by means of pump 48. Used wash solvent, containing dissolved oil, is removed from the upper section of zone 16 to fractionator 19 through conduit 18. In the fractionator solvent is stripped from oil and passes after condensation by condenser 49 to separation zone 22 through conduit 21. Liquid oil is pumped from the bottom of the fractionator by pump 50 and added to the liquid oil charge by means of conduit 20. The oil from the fractionator is heated to the treating temperature by heater 50. Washed used adsorbent, having solvent adhering thereto is passed into the upper section of drying zone 24. In the drying zone a bed of adsorbent in a state of ebullient motion which resembles a boiling fluid is maintained. The temperature of this bed is maintained at a level sufficient to vaporize the vaporizable material in the adsorbent. This vaporizable material is mainly solvent. The desired temperature level is effected by circulating a suitable heat transfer fluid through the heat transfer tubes in the drying zone. An inert stripping gas is introduced into zone 24 through passage 27. The stripping gas may be any inert, readily condensible gas or uncondensible gas. Superheated steam is a preferred stripping gas and is used in the process of Figure 1. Superheated steam is passed upwardly through the adsorbent bed at a velocity sufficient to entrain adsorbent fines therein. The steam also acts to strip vaporized material, such as solvent, from the adsorbent in zone 24 and aids in maintaining the boiling bed in a state of ebullient motion in the drying zone.

Steam, vaporized solvent and entrained fines all pass out of drying zone 24 through conduit 28 into quencher 29. In the quencher, the steam and vaporized solvent are condensed by direct heat exchange with a cold heat transfer fluid such as cool washing naphtha, water, etc. Cold water is preferred. Water and liquid solvent pass into settling or separation zone 22. In zone 22 the solvent is separated from the water and fines by settling, water and fines dropping to the bottom of 22. Water and fines are discarded through passage 50.

In cases where flue gas is employed for stripping purposes in the drier and the cooling liquid is not, as usually preferred, immiscible with the recovered solvent, or where the cooling liquid is a portion of cooled solvent, it is desirable to recover the liquid with the fines via pipe 50 by filtration. In normal operation adsorbent fines are also removed with the effluent liquid streams from treater 10 and washer 16. The use of the drier and quencher in the above described manner to remove fines decreases the amount of fines removed by these liquid streams and thereby provides a more efficient operation since the required settling time of these liquid streams will be lower.

A suitable quencher for use in the process of this invention is shown in Figure 2. Spaced vertically along the center line of the quenching vessel 29 are circular baffles 51. Ring shaped baffles 52 are spaced vertically along the inner periphery of vessel 29 at levels intermediately between baffles 51. Cold water enters through conduit 30 while steam, vaporized solvent and fines enter through 28. The two streams are intimately mixed as they flow downwardly through 29 by the baffling action of baffles 51 and 52, thereby condensing steam and solvent.

Returning to Figure 1, dried used adsorbent passes from drying zone 24 by means of passage 32 and is conveyed to the top of regeneration zone 34 by means of conveyor 33 and conduit 35. The used adsorbent passes through zone 34 as a downwardly gravitating, substantially compact column. An oxygen containing gas, such as air, is introduced into the lower section of zone 34 through passage 38 and passes upwardly through the adsorbent column to burn off the carbonaceous contaminant thereon. Flue gas is removed through conduit 39. The temperature of the adsorbent is maintained below the temperature at which the adsorbent will be permanently damaged by circulating a suitable coolant through heat transfer tubes in the regenerator. Regenerated adsorbent passes from the lower section of zone 34 by means of conduit 40 and is cooled to a temperature suitable for use in treating zone 10 by means of a suitable cooling fluid circulated through cooler 41. The cooled adsorbent is then passed to hopper 11 by means of conveyor 42 and conduit 43. From the hopper, adsorbent is returned to zone 10 through conduit 12.

An alternate process of this invention for normal operation of the percolation system, which is especially favorable when attrition rates are high, may be accomplished by opening valve 45 in conduit 44 to a position where a portion of the adsorbent from the regeneration zone, flowing in line 43 is recycled to the drying zone 24 through passages 44 and 23, while the remainder of the adsorbent flows through conduit 43 to hopper 11. By this method, a greater amount of the fines in the system will be passed into drying zone 24 and be removed by the process previously described. The position of recycle stream 44 is most advantageously placed so that it recycles adsorbent which has already passed through conveyors 33 and 42.

This invention is most advantageously used during start-up periods while the temperature of the adsorbent in the system is being raised to the desired treating temperature before it is contacted with any of the charge oil.

It is also very useful for regulating the size distribution of the adsorbent prior to its use for treating in those operations in which no heating of the adsorbent stream is required. There are several ways of accomplishing these ends. On way is to close valves 53, 54, and 55 while opening valve 45. No charge oil is introduced to treating zone 10 and no wash solvent to washing zone 16. The drying zone and fines removal system and the regeneration zone are operated, the adsorbent being passed cyclically through the drying zone and regeneration zone only. Cooler 41 is not operated. Heat is supplied to the adsorbent in the drying zone by means of the heat transfer tubes therein and by the stripping gas. Fines and any foreign matter are removed as previously described. Moisture may also be removed from the adsorbent in this manner. Any carbonaceous contaminants on the adsorbent are removed in the regeneration zone, which also acts to heat the adsorbent. In less preferred forms of the invention, when heating of the adsorbent in the drier is not necessary, an inert stripping gas, such as air or flue gas, may be employed to strip the fines from the adsorbent in the drier, in which case the fines are washed from the stripping gas in zone 29. When the adsorbent is conditioned to the desired extent, valve 45 is closed and valves 53, 54 and 55 are opened, and the system is put into normal operation. A method preferable to this is to operate only the drier and regenerator with valve 45 closed and valves 53, 54, and 55 open. This accomplishes the conditioning of all the adsorbent in the system before it is put on stream and not just the adsorbent in the drier and regenerator. Another way of effecting this is to close valve 53 while opening valves 45, 54, and 55, and providing a storage space in the system, exclusive of the treater and washer, which is capable of holding a volume equal to the volume of the treater and washer. By this method, adsorbent is only circulated through the drier and regenerator but all of the adsorbent in the system is conditioned prior to the start-up of the treating operation. The regenerator is preferably shut down after one cycle of the adsorbent therethrough in the start-up operation.

Obviously, the various components of this improved process may take other forms than those shown and described above. For example, the drying zone may be operated so that adsorbent passes therethrough as a substantially compact bed rather than a boiling bed. The heat added to the drier might all be supplied by the inert stripping gas rather than through heat transfer tubes. The quencher may be of the form of a simple condenser with heat removed by indirect rather than direct heat exchange. Also, the quencher and separator may be combined in one vessel.

The treating temperature in zone 10 may fall within the range of atmospheric temperature to 700° F. but should generally be maintained below the flash point of the oil as measured by the ASTM Cleveland Open Cup Method. The drying zone should be maintained at a temperature generally within the range about 215° F. to 500° F. The stripping gas should be passed through the drying zone generally at a rate sufficient to remove all the fines below 150 mesh Tyler and to reduce the total amount of fine material having less than 100 mesh average diameter below 3%, and preferably below 1%, by weight of the total adsorbent stream. Generally, the superficial stripping gas velocity in the drying zone should be from about 0.2 foot per second to 1.5 feet per second. The settler 22 should be large enough to provide for substantially complete separation of water and fines from solvent. When recycle stream 44 is used generally about 5% to 25% of the adsorbent flowing in 43 should be recycled. When this invention is used as a start-up process for the percolation system, adsorbent should be circulated only through the drier and regenerator until the total amount of fines below about 100 mesh are less than 5% of the total adsorbent stream or until the adsorbent stream reaches the desired treating temperature, whichever occurs later.

As an example of the process of this invention, its operation in connection with a continuous process for treating liquid mineral oils with adsorbent bauxite will be considered. During the start-up period the process was used as described hereinabove and contact material circulated only through the drier and regenerator at a rate of about 5 tons per hour. Super-heated steam was passed upwardly through the drier, which was operated with the adsorbent therein in a state of ebullient motion, at a superficial velocity of about one foot per second to entrain fines and other foreign matter. Heat as supplied to the bed in the dried by indirect heat exchange with super-heated steam. The bed was maintained at a temperature of 400° F. by this means. The start-up operation was continued until the total amount of adsorbent fines below 100 mesh was below 2% of the total adsorbent stream. The temperature of the adsorbent in the dryer at the end of the start-up period was about 400° F. The quencher was operated at a temperature of about 120° F. The entire process was then started up and the adsorbent having an average diameter below 100 mesh was maintained below 2% of the total adsorbent stream by fines removal in the liquid effluent from the treater and washer and by entrainment in the drier.

This invention should be understood to cover all changes and modifications of the example of the invention herein chosen for purposes of disclosure which do not constitute departures from the spirit and scope of the invention.

I claim:

1. A process for the continuous treatment of liquid hydrocarbon oils to purify the same which comprises: contacting a liquid hydrocarbon oil with a moving columnar mass of adsorbent of palpable particle form within a confined treating zone, passing used adsorbent from the treating zone into a confined washing zone, contacting the used adsorbent in the washing zone with a washing solvent whereby adhering oil is removed from the used adsorbent, passing the washed used adsorbent into a confined drying zone, heating the adsorbent in the drying zone to a temperature level sufficient to vaporize any washing solvent adhering to the adsorbent, passing an inert condensible stripping gas upwardly through the drying zone at a velocity sufficient to entrain adsorbent fines therein and to strip solvent vapors from the adsorbent, removing dried adsorbent from the drying zone, maintaining the velocity of the stripping gas within the drying zone sufficiently high to remove from the drying zone all adsorbent fines of a size less than 150 mesh Tyler and to reduce the quantity of adsorbent of a size less than 100 mesh Tyler to less than 3% by weight of the dried adsorbent removed from the drying zone, removing a stream of inert stripping gas, vaporized solvent and entrained fines together from the upper section of the drying zone and passing said stream to a confined quenching zone, condensing the stripping gas and solvent vapors in said quenching zone, removing condensed stripping gas and solvent and fines from the lower section of the quenching zone to a separation zone, separating condensed solvent from the condensed stripping gas and adsorbent fines, passing dried adsorbent from the drying zone to a confined regeneration zone wherein the adsorbent is reconditioned for reuse in the treating zone and passing reconditioned adsorbent from the regeneration zone into the treating zone.

2. In a continuous process for the purification of liquid mineral oils by contact with a moving columnar mass of adsorbent of palpable particle form within a confined treating zone wherein the used adsorbent after the contacting is washed with a washing solvent in a washing zone and dried of adhering solvent in a drying zone and reconditioned by burning in a regeneration zone and returned to the treating zone, the improvement which comprises: passing superheated steam upwardly through the drying zone at a rate sufficient to entrain adsorbent fines in the steam and to vaporize adhering solvent from the adsorbent therein, maintaining the velocity of steam within the drying zone sufficiently high to remove from the drying zone all adsorbent fines of a size less than 150 mesh Tyler and to reduce the quantity of adsorbent of a size less than 100 mesh Tyler to less than 3% by weight of the dried adsorbent which passes from the drying zone, passing a stream of steam and vaporized solvent containing adsorbent fines from the drying zone to a confined quenching zone, condensing the steam and solvent in the quenching zone to water and liquid solvent by direct heat exchange with cold water, passing the water and liquid solvent and adsorbent fines to a confined settling zone, separating solvent from the water and adsorbent fines in the settling zone by allowing the water and fines to settle out of the solvent within the settling zone and removing the liquid solvent from the settling zone separately of the water and adsorbent fines.

3. In a continuous process for the treatment of liquid mineral oils with a palpable particle form adsorbent wherein the adsorbent is passed through a confined treating zone as a moving columnar mass to be therein contacted with the liquid mineral oil, then through a washing zone wherein the adsorbent is washed with a washing solvent, then through a drying zone wherein the adsorbent is dried, then through a regeneration zone wherein the adsorbent is reconditioned for reuse in the treating zone the improved process for removing adsorbent fines from the treating system which comprises recycling a portion of the adsorbent from the regeneration zone to the drying zone, returning the remaining portion of adsorbent from the regeneration zone to the treating zone, passing a stream of inert condensible stripping gas upwardly through the drying zone at a rate sufficient to entrain adsorbent fines therein and to strip the adsorbent therein of vaporized wash solvent, removing dried adsorbent from the drying zone, maintaining the velocity of the stripping gas within the drying zone sufficiently high to remove from the drying zone all adsorbent fines of a size less than 150 mesh Tyler and to reduce the quantity of adsorbent of a size less than 100 mesh Tyler to less than 3% by weight of the dried adsorbent removed from the drying zone, passing stripping gas, solvent and adsorbent fines to a confined quenching zone, condensing the stripping gas and solvent in the quenching zone, passing condensed stripping gas and solvent and adsorbent fines to a separation zone wherein the condensed solvent is separated from the condensed stripping gas and fines, returning the condensed solvent to the washing zone and discarding the condensed stripping gas and adsorbent fines from the treating system.

4. In a continuous process for the treating of liquid mineral oils with palpable particle form adsorbent solids, wherein the adsorbent is passed cyclically through a confined treating zone as a columnar mass to contact a liquid oil charge at elevated temperatures, a confined washing zone wherein used adsorbent is washed with a washing solvent, a confined treating zone wherein solvent is removed from the adsorbent and a confined regeneration zone wherein the adsorbent is reconditioned for re-use in the treating zone, and wherein during such cyclic passage there becomes associated with said adsorbent quantities of solid material substantially finer than the particle form adsorbent, the improved process for starting up the treating process after it has been shut down, which comprises: passing the total flow of adsorbent containing the fine solid material around the treating zone so that there is no adsorbent flow therethrough; passing the adsorbent into the drying zone and supplying heat to the adsorbent therein; passing an inert stripping gas through the adsorbent in the drying zone at a rate sufficient to entrain all fine solid material having a size less than 150 mesh Tyler; passing adsorbent from the drying zone into the regeneration zone; and returning adsorbent from the regeneration zone to the drying zone; and continuously cycling the adsorbent between drying zone and regeneration zone until the adsorbent is elevated in temperature to the desired treating temperature and then passing the adsorbent into the treating zone.

5. In a continuous process for the treatment of liquid mineral oils with a palpable particle form adsorbent solid, wherein the adsorbent is cycled through a plurality of zones, first passing through a confined treating zone as a columnar mass to be contacted therein, at elevated temperatures by a liquid oil charge, then through a confined washing zone wherein used adsorbent is washed with solvent, then through a confined drying zone wherein solvent is removed from the adsorbent and finally through a confined regeneration zone wherein the adsorbent is reconditioned for re-use in the treating zone, and during the course of which process fine material is picked up by the circulating adsorbent stream, the improved process for starting up the treating process, which comprises: bypassing the total flow of adsorbent containing the fine material around the treating and washing zones so that there is no adsorbent flow through said zones; continuously cycling adsorbent through the drying and regeneration zones; heating the adsorbent in the drying zone; passing an inert stripping gas through the adsorbent in the drying zone at a velocity sufficient to entrain the fine material and passing adsorbent into the treating zone to start up the cyclic treating process when all fine material below 150 mesh has been removed and the total amount of fine material of a size less than 100 mesh is less than 3 percent of the total adsorbent stream and the temperature of the adsorbent is about equal to the desired treating temperature.

References Cited in the file of this patent

UNITED STATES PATENTS

| | | |
|---|---|---|
| 1,868,581 | Miller | July 26, 1932 |
| 2,273,076 | Voorhees | Feb. 17, 1942 |
| 2,278,836 | Day | Apr. 7, 1942 |
| 2,384,311 | Kearby | Sept. 4, 1945 |
| 2,395,491 | Mavity | Feb. 26, 1945 |
| 2,425,482 | Moser | Aug. 12, 1947 |
| 2,522,426 | Black | Sept. 12, 1950 |
| 2,567,207 | Hoge | Sept. 11, 1951 |
| 2,571,380 | Penick | Oct. 16, 1951 |
| 2,580,827 | Payne | Jan. 1, 1952 |
| 2,589,981 | Weeks | Mar. 18, 1952 |
| 2,626,205 | Watson | Jan. 20, 1953 |
| 2,656,306 | Bergstrom et al. | Oct. 20, 1953 |
| 2,701,786 | Evans et al. | Feb. 8, 1955 |